US012801176B2

(12) United States Patent
Carton et al.

(10) Patent No.: US 12,801,176 B2
(45) Date of Patent: Nov. 17, 2026

(54) BUTTON

(71) Applicant: CROUZET, Valence (FR)

(72) Inventors: Hervé Carton, Valence (FR); Thomas Stemmelen, Valence (FR)

(73) Assignee: CROUZET, Valence (FR)

( * ) Notice: Subject to any disclaimer, the term of this patent is extended or adjusted under 35 U.S.C. 154(b) by 341 days.

(21) Appl. No.: 18/715,616

(22) PCT Filed: Nov. 29, 2022

(86) PCT No.: PCT/EP2022/083704
§ 371 (c)(1),
(2) Date: May 31, 2024

(87) PCT Pub. No.: WO2023/099490
PCT Pub. Date: Jun. 8, 2023

(65) Prior Publication Data

US 2025/0036152 A1 Jan. 30, 2025

(30) Foreign Application Priority Data

Dec. 1, 2021 (FR) ...................................... 2112808

(51) Int. Cl.
*G05G 1/02* (2006.01)
*G05G 1/54* (2008.04)

(52) U.S. Cl.
CPC ................. *G05G 1/02* (2013.01); *G05G 1/54* (2013.01)

(58) Field of Classification Search
None
See application file for complete search history.

(56) References Cited

U.S. PATENT DOCUMENTS

| | | | | |
|---|---|---|---|---|
| 5,542,279 | A | 8/1996 | Erdman et al. | |
| 6,567,033 | B1 * | 5/2003 | Astic | G01D 5/165 702/94 |
| 2013/0147494 | A1 | 6/2013 | Bellon | |

FOREIGN PATENT DOCUMENTS

| | | | | |
|---|---|---|---|---|
| DE | 3522775 | A1 | 1/1987 | |
| EP | 0065901 | A1 * | 12/1982 | G01R 15/005 |

(Continued)

OTHER PUBLICATIONS

International Search Report for International Application No. PCT/EP2022/083704, mailed Mar. 22, 2023, 7 pages with English translation.

(Continued)

*Primary Examiner* — Rodney E Fuller
(74) *Attorney, Agent, or Firm* — TraskBritt

(57) ABSTRACT

A button includes an electronic circuit. The electronic circuit includes a potentiometer having a first center tap connected to an output terminal. A second center tap is connected to a first terminal of the potentiometer via a first resistor, to a first supply terminal via a second resistor, and to a second supply terminal via a third resistor. The resistance of the second resistor is equal to $(1-k_x)R_x$. The resistance of the third resistor is equal to $k_xR_x$. A third center tap is connected to a second terminal of the potentiometer via a fourth resistor, to the first supply terminal via a fifth resistor, and to the second supply terminal via a sixth resistor. The resistance of the fifth resistor is equal to $(1-k_y)R_y$. The value of the sixth resistor is equal to $k_yR_y$.

10 Claims, 2 Drawing Sheets

(56) References Cited

FOREIGN PATENT DOCUMENTS

| | | | | | |
|---|---|---|---|---|---|
| EP | 0877393 | A1 | | 11/1998 | |
| EP | 1887368 | A1 | | 2/2008 | |
| EP | 2602695 | A1 | | 6/2013 | |
| JP | 2005535275 | A | * | 11/2005 | ............... H02H 3/14 |

OTHER PUBLICATIONS

International Written Opinion for International Application No. PCT/EP2022/083704, mailed Mar. 22, 2023, 10 pages with English machine translation.

* cited by examiner

BUTTON

CROSS REFERENCE TO RELATED APPLICATIONS

This application is a national phase entry under 35 U.S.C. § 371 of International Patent Application PCT/EP2022/083704, filed Nov. 29, 2022, designating the United States of America and published as International Patent Publication WO 2023/099490 A1 on Jun. 8, 2023, which claims benefit, under Article 8 of the Patent Cooperation Treaty, to French Patent Application Serial No. FR2112808, filed Dec. 1, 2021.

TECHNICAL FIELD

The disclosure relates to a button as well as to a set of several of these buttons. The disclosure also relates to a method for manufacturing this button.

BACKGROUND

Known buttons comprise an electronic circuit equipped with:

- a cursor that can be moved along a predetermined trajectory between a proximal position and a distal position; and
- a linear potentiometer, the resistance of which continuously varies from a minimum value up to a maximum value when the cursor is moved from its proximal position to its distal position.

The known buttons also comprise a return mechanism that automatically returns the cursor to a neutral position in the absence of external stress.

Each of these known buttons has a transfer function in the following format: $V_s/U=\alpha C_1+C_2$, where:

- a is a curvilinear abscissa ranging between 0 and 1 and that varies in proportion to the position occupied by the cursor between its proximal and distal positions;
- $C_1$ and $C_2$ are coefficients specific to each button;
- $V_s$ is the voltage representing the position of the cursor delivered by the button; and
- U is the power supply voltage of the button.

Due to the manufacturing tolerances, notably on the potentiometers and on the return mechanism, the values of the coefficients $C_1$ and $C_2$ are different from one button to another.

In particular, due to the manufacturing tolerances on the return mechanism, there is a deviation $d\alpha$ between:

- the value of this abscissa $\alpha$ when the cursor is in the neutral position to which it is actually returned by the return mechanism; and
- the theoretical value that the abscissa $\alpha$ should assume when the cursor is in its neutral position.

This deviation $d\alpha$ is not known in advance. Consequently, the voltage $V_s$ delivered by the button when the cursor is in its neutral position is also not precisely known in advance.

Similarly, due to the manufacturing tolerances on the potentiometer, the values of the voltage $V_s$ when the abscissa $\alpha$ is equal to 0 and when the abscissa $\alpha$ is equal to 1 are not precisely known in advance.

Consequently, when such a button is connected to an electronic computer that controls an appliance as a function of the position of the cursor of the button, a phase of calibrating the electronic computer needs to be performed beforehand. During this calibration phase, the values of the voltage $V_s$ corresponding to the neutral position and to the proximal and distal positions of the cursor are learned by the electronic computer.

Subsequently, if this button is replaced by a new button, even if this new button is structurally identical to the replaced button, its transfer function is different due to the inevitable manufacturing tolerances. Consequently, each time a button is replaced, the phase of calibrating the electronic computer must be performed again.

In order to avoid this calibration phase, it has been proposed for very precise potentiometers and return mechanisms to be used in order to limit the deviations due to manufacturing tolerances. It has also been proposed for a microcontroller to be integrated inside the button that modifies the output voltage $V_s$ so that it follows a transfer function pre-recorded in this microcontroller. All these proposals result in more complex and more expensive components being integrated into the button and therefore make manufacturing the button more complex.

Prior art is also known from documents EP 2602695 A1, EP 1887368 A1, DE 3522775 A1, U.S. Pat. No. 5,542,279 A and EP 0877393 A1. The architecture of the buttons disclosed in these documents does not allow a predetermined target transfer function to be achieved without necessarily integrating complex components into these buttons and/or despite the existence of a manufacturing tolerance on the potentiometer and on the return mechanism.

BRIEF SUMMARY

The aim of the disclosure is to propose a button whose architecture allows a predetermined target transfer function to be achieved in advance without necessarily integrating complex components into the button, despite the existence of a manufacturing tolerance on the potentiometer and the return mechanism. To this end, the aim of embodiments of the disclosure is a button as claimed in claim(s) herein.

A further aim of embodiments of the disclosure is a set of several of the aforementioned buttons.

Finally, a further aim of embodiments of the disclosure is a method for manufacturing this button.

BRIEF DESCRIPTION OF THE DRAWINGS

Embodiments of the disclosure will be better understood upon reading the following description, which is provided solely by way of non-limiting example and with reference to the drawings, in which.

DETAILED DESCRIPTION

Throughout the figures, the same reference signs are used to designate the same elements. Throughout the remainder of this description, the features and the functions that are well known to a person skilled in the art are not described in detail.

Throughout this description, the terminology and certain definitions are introduced in Chapter I. Then, a detailed example of an embodiment is described in Chapter II with reference to the figures. Alternative embodiments of this embodiment are introduced in Chapter III. Finally, the advantages of the various embodiments are introduced in Chapter IV.

Chapter I. Terminology and Definitions

Throughout this document, unless otherwise indicated, the term "connecting" means electrically connecting.

The expression "an element A directly connected to an element B" means that the elements A and B are directly electrically connected to each other, i.e., they are only electrically connected to one another via a conductive track or via an electrical wire. In the case whereby the elements A and B are directly connected to one another, these two elements are connected without passing through another electrical component such as an electrical resistor other than the inevitable electrical resistor of the conductive track or of the electrical wire.

The term "resistance" denotes an electrical resistance with a value that is expressed in Ohms.

Throughout this text, the same symbol is used to designate a resistance and its value. Thus, the expression a "resistance X" denotes an electrical resistance with a value that is equal to X Ohms.

Chapter II. Example of an Embodiment

Figure 1:
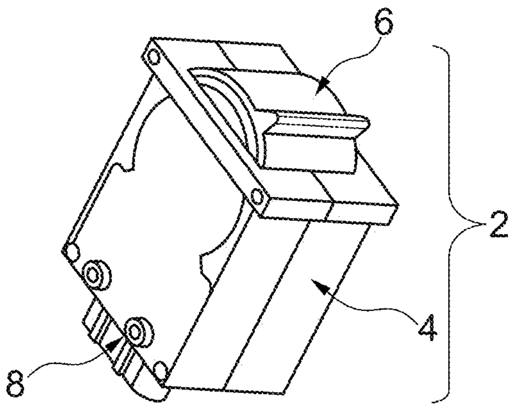
FIG. 1 is a perspective illustration of a button.

FIG. 1 shows a button 2 comprising a housing 4 and a gripping component 6 protruding from the housing 4. In this example, the component 6 is a thumbwheel that can be directly rotated by the hand of a human user and, more specifically in this case, by the thumb of the user. The button 2 also comprises a connector 8 that allows it to be connected to a power supply source and to an electronic computer.

Figure 2:
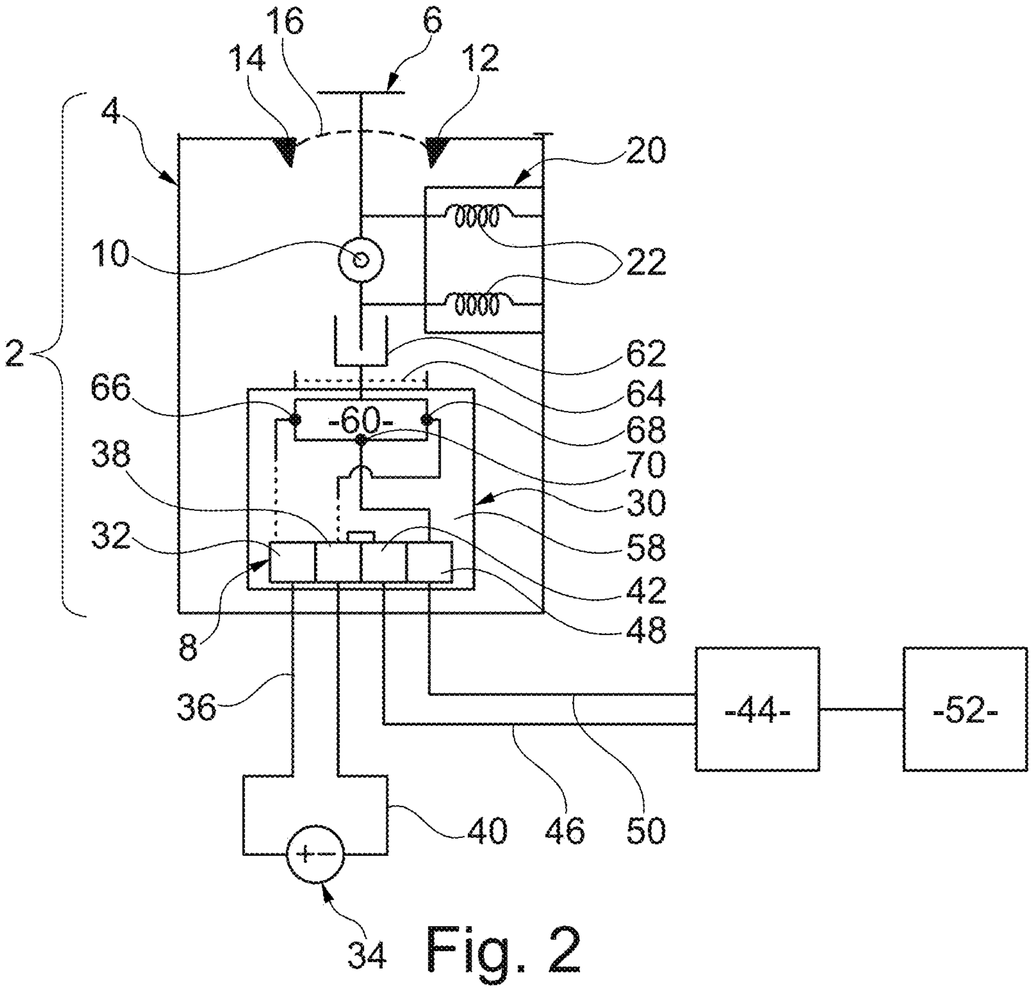
FIG. 2 is a schematic illustration of various elements of the button of FIG. 1.

FIG. 2 schematically shows the main elements of the button 2. The button 2 comprises a shaft 10, around which the component 6 pivots from a close position to a remote position, and vice versa. The shaft 10 is fixed to the housing 4 without any degree of freedom, for example. In this case, in the close position, the component 6 is in mechanical abutment on a stop 12 of the housing 4. In the remote position, the component 6 is in mechanical abutment on a stop 14 of the housing 4. The stops 12 and 14 are opposite each other. The component 6 moves between these stops 12 and 14 along a trajectory 16 in an arc of a circle, shown as dashed lines in FIG. 2, when the component 6 is pushed or pulled by the user. In this case, the trajectory 16 is included in a plane perpendicular to the shaft 10. The length of the trajectory 16 is typically greater than 5 mm or 1 cm.

The button 2 comprises a return mechanism 20 that automatically returns the component 6 to a neutral position as soon as the user no longer exerts any stress on this component 6. To this end, typically, the mechanism 20 comprises return springs or magnets 22. In this case, the mechanism 20 is fixed to the housing 4 on one side and to the component 6 on an opposite side.

In this embodiment, the neutral position is the position that is theoretically located exactly halfway between the close and remote positions.

The button 2 also comprises an electronic circuit 30 that delivers a voltage $V_s$ representing the position of the component 6 along its trajectory 16. To this end, the electronic circuit 30 is connected to the connector 8.

The connector 8 notably comprises:

- a power supply terminal 32 connected to the positive potential of a DC power supply source 34 via a wire 36;
- a power supply terminal 38 connected to the negative potential of the power supply source 34 via a wire 40;
- an output terminal 42 connected to an electronic computer 44 via a wire 46; and
- an output terminal 48 connected to the electronic computer 44 via a wire 50.

The source 34 delivers a DC voltage U.

The voltage between the output terminals 42 and 48 is the voltage $V_s$. In this case, the terminal 42 is directly connected to the power supply terminal 38 that corresponds to the ground of the circuit 30.

The electronic computer 44 acquires the voltage $V_s$ delivered by the button 2 and typically controls an electronic appliance 52 as a function of this voltage $V_s$.

The circuit 30 is implemented on a printed circuit 58, on which the electrical components of the circuit 30 are mounted. In this case, the connector 8 is also mounted on the printed circuit 58.

The circuit 30 particularly comprises a potentiometer 60. This potentiometer 60 is a linear analog potentiometer. The potentiometer 60 comprises a cursor 62 that moves along a predetermined trajectory 64. The trajectory 64 is schematically shown by a segment in the vicinity of the potentiometer 60 in FIG. 2. This trajectory 64 is straight or in an arc of a circle. In FIG. 2, it is shown as being straight.

The cursor 62 is mechanically connected to the component 6 so that a movement of the component 6 causes a proportional movement of the cursor 62 along its trajectory 64. In this case, when the component 6 is in its close position, the cursor 62 is in a proximal position and the resistance of the potentiometer 60 is minimal. When the component 6 is in its remote position, the cursor 62 is in a distal position and the resistance of the potentiometer 60 is maximal. The trajectory 64 extends from the proximal position to the distal position.

Subsequently, the position of the cursor 62 along its trajectory 64 is identified by a curvilinear abscissa $\alpha$. The value of the abscissa $\alpha$ varies in proportion to the distance covered by the cursor 62 along the trajectory 64 from a home position. The home position of the trajectory 64 is the point occupied by the cursor 62 when it is in its proximal position. The end position of the trajectory 64 is the point occupied by the cursor 62 when it is in its distal position. The total length of the trajectory 64 is equal to the length of the trajectory 64 between its home position and its end position.

The value of the abscissa $\alpha$ continuously varies between 0 and 1. The values 0 and 1 of the abscissa $\alpha$ respectively correspond to the proximal position and to the distal position of the cursor 62. Thus, the position of the component 6 along its trajectory can be easily obtained by multiplying the length of the trajectory 16 by the value of the abscissa $\alpha$.

In this case, in the theoretical neutral position, the value of the abscissa $\alpha$ is equal to 0.5. However, in practice, due to manufacturing tolerances, and, in particular, due to manufacturing tolerances on the mechanisms 20, 10, 6 and 60, a deviation, denoted da, often exists between the theoretical neutral position and the actually measured neutral position. The absolute value of this deviation $d\alpha$ nevertheless is generally less than 0.1, which corresponds to an error of less than 10%.

The potentiometer 60 comprises:

- a terminal 66 connected to the power supply terminal 32;
- a terminal 68 connected to the power supply terminal 38; and
- a center tap 70 connected to the output terminal 48.

In this case, the center tap 70 is directly connected to the terminal 48 via a conductive track of the printed circuit 58.

The dashed lines on the lines that connect the terminals 66 and 68 to the terminals 32 and 38, respectively, indicate that these terminals 66 and 68 are connected to the terminals 32 and 38 by passing through other electronic components that have not been shown in FIG. 2.

The total resistance $R_{60T}$ of the potentiometer 60 is equal to the resistance between its terminals 66 and 68. The value of this total resistance $R_{60T}$ is theoretically equal to a nominal value $R_{60N}$ provided by the manufacturer of the potentiometer 60. However, in practice, there is almost always a deviation, denoted $dR/R_{60N}$ herein, between the values $R_{60T}$ and $R_{60N}$. This deviation $dR/R_{60N}$ is notably due to the manufacturing tolerances and any faults when manufacturing the potentiometer 60. In this case, this deviation $dR/R_{60N}$ is equal to the ratio $(R_{60T}-R_{60N})/R_{60N}$. Thus, this deviation $dR/R_{60N}$ varies between 0 and 1. In practice, the absolute value of the deviation $dR/R_{60N}$ is almost always less than 0.1, which corresponds to an error of 10% compared to the nominal value $R_{60N}$.

The resistance between the center tap 70 and the terminal 68 varies in proportion to the position of the cursor 62 along its trajectory 64. Thus, the potentiometer 60 converts a mechanical movement of the cursor 62 into a corresponding variation of a resistance. In this case, when the cursor 62 is in its proximal position, the value of the resistance between the center tap 70 and the terminal 68 is equal to $R_n$. This value $R_n$ optionally can be zero. When the cursor 62 is in its distal position, the value of the resistance between the center tap 70 and the terminal 68 is equal to the value $R_n$+RPU, where RPU is the useful resistance of the potentiometer 60. Thus, the value of the resistance between the center tap 70 and the terminal 68 linearly varies from the value $R_n$ as a function of the abscissa α, when the abscissa α is equal to zero, up to the value $R_n$+RPU when the abscissa α is equal to 1. Thus, the value of the resistance between the center tap 70 and the terminal 68 is equal to $R_n$+αRPU.

The value $R_{60T}$ of the total resistance of the potentiometer can be greater than the value $R_n$+RPU. In this case, the value $R_{60T}$ is therefore equal to the sum $R_n$+RPU+$R_m$, where the value $R_m$ is the value of a residual resistance. The value $R_m$ optionally can be zero.

Figure 3:
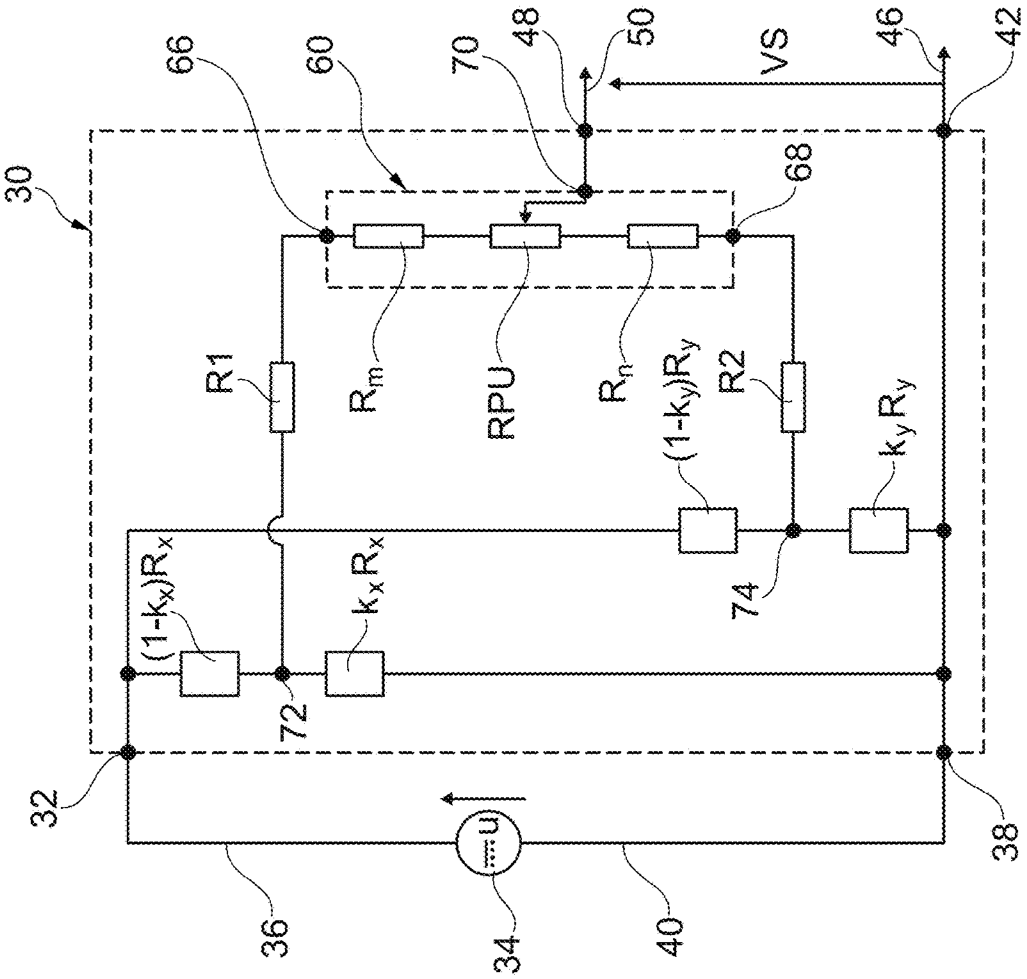
FIG. 3 is a diagram of an electronic circuit of the button of FIG. 1.

FIG. 3 shows the electronic diagram of the circuit 30. In this diagram, in order to reveal the three portions of the total resistance $R_{60T}$ of the potentiometer 60, this total resistance $R_{60T}$ is shown in the form of three resistors $R_n$, RPU and $R_m$ connected in series between the terminals 66 and 68.

In this diagram, each solid line between two resistors represents a conductive track of the printed circuit 58 that directly connects together these two resistors.

The terminal 68 of the potentiometer 60 is connected to the power supply terminal 38 via a resistor R2 and a resistor $k_yR_y$ in series. The coefficient $k_y$ ranges between 0 and 1. The resistance $R_y$ is the value of a total resistance $R_y$.

The circuit 30 comprises a center tap 74 between the resistors R2 and $k_yR_y$ that is connected to the power supply terminal 32 via a resistor $(1-k_y)R_y$, where $k_y$ and $R_y$ are the same symbols as those previously defined.

The terminal 66 of the potentiometer 60 is connected to the power supply terminal 32 via a resistor R1 and a resistor $(1-k_x)R_x$ in series. The coefficient $k_x$ is a coefficient ranging between 0 and 1. The resistance $R_x$ is the value of a total resistance $R_x$.

The circuit 30 comprises a center tap 72 between the resistors R1 and $(1-k_x)R_x$ that is connected to the power supply terminal 38 via a resistor $k_xR_x$, where the symbols $k_x$ and $R_x$ are the same as those previously defined.

The transfer function of the circuit 30 that connects the abscissa α at the voltage $V_s$ is a linear transfer function defined by the following relation: $V_s/U=\alpha C_1+C_2$, where $C_1$ and $C_2$ are the coefficients of this linear transfer function.

The resistors R1, R2, $k_xR_x$, $(1-k_x)R_x$, $k_yR_y$ and $(1-k_y)R_y$ allow the coefficients $C_1$ and $C_2$ to be adjusted so that these coefficients each have a desired target value. In this case, the target values of the coefficients $C_1$ and $C_2$ are identical to those of the other buttons of a set of several structurally identical buttons. More specifically, the buttons of this set are all identical except that:

- because of the manufacturing tolerances, the deviations dα and $dR/R_{60N}$ of each of these buttons are not necessarily the same; and
- the values of the resistors R1, R2, $k_xR_x$, $(1-k_x)R_x$, $k_yR_y$ and $(1-k_y)R_y$ of each of these buttons are not necessarily the same either.

This set of buttons typically comprises more than one hundred or more than one thousand buttons.

In other words, the resistors R1, R2, $k_xR_x$, $(1-k_x)R_x$, $k_yR_y$ and $(1-k_y)R_y$ allow a set of several buttons to be manufactured that all have the same transfer function. However, these resistors do not include the function of limiting the dead band or the hysteresis phenomena of the mechanism 20. Throughout this document, two transfer functions are considered to be identical if the maximum deviation between these two transfer functions and a target transfer function common to all the buttons of this set is less than 5%, and preferably less than 2% or 1%. The maximum deviation between a transfer function of a button and the target transfer function is equal to the largest of the deviations $dC_1$ and $dC_2$, where:

- the deviation $dC_1$ is equal to $(C_{11}-C_{1c})/C_{1c}$, where $C_{11}$ and $C_{1c}$ are the values of the coefficient $C_1$, respectively, of the transfer function of the button and of the target transfer function; and
- the deviation $dC_2$ is equal to $(C_{21}-C_{2c})/C_{2c}$, where $C_{21}$ and $C_{2c}$ are the values of the coefficients $C_2$, respectively, of the transfer function of the button and of the target transfer function.

Consequently, when a button of such a set is replaced by a new button of the same set, a new phase of calibrating the electronic computer 44 does not need to be performed in order for it to correct the deviations between the transfer function of the replaced button and the transfer function of the new button. Indeed, the transfer functions of the replaced button and of the new button are identical, because the resistors R1, R2, $k_xR_x$, $(1-k_x)R_x$, $k_yR_y$ and $(1-k_y)R_y$ have been selected to this end. This therefore considerably simplifies the replacement of a button of this set with another button of the same set.

Figure 4:
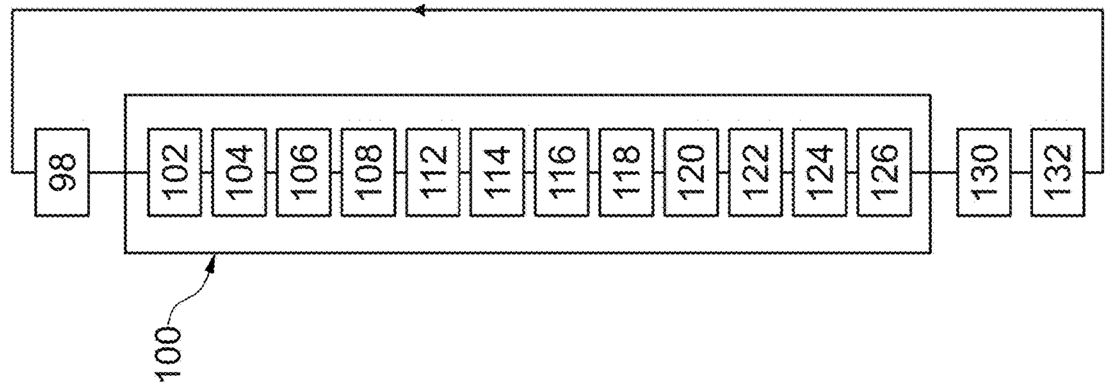
FIG. 4 is a flowchart of a method for manufacturing the button of FIG. 1.

A method for manufacturing this set of buttons and for sizing the various resistors of the circuit 30 will now be described with reference to FIG. 4.

The sizing method described hereafter refers to various conditions that are to be met so that suitable values for the six resistors of the circuit 30 can be obtained. These various conditions are initially shown in their generic form before continuing the description of this manufacturing method.

The first four conditions are as follows:

$$d\alpha^* C_1 < C_2 < 1-(1-d\alpha)^* C_1; \quad \text{condition(1.1)}$$

$$C_1 + C_2 \le 1; \quad \text{condition(2)}$$

-continued $$0 \le R1_x / R_{60N} \le [(1 - C_2)/C_1(2 - d\alpha)]^*(1 + dR/R_{60N}); \quad \text{condition(3.1)}$$

$$0 \le R2_y / R_{60N} \le [C_2/C_1 - d\alpha]^*(1 + dR/R_{60N}); \quad \text{condition(4.1)}$$

where $R1_x$ is equal to $R1 + RT_x + R_m$;

$R2_y$ is equal to $R2 + RT_y + R_n$;

$RT_x$ is equal to $k_x * (1 - k_x) * R_x$;

$RT_y$ is equal to $k_y * (1 - k_y) * R_y$;

the symbol "*" designates the arithmetic multiplication operation when this multiplication operation is explicitly shown in a relation.

When conditions (1.1), (3.1) and (4.1) are met, the coefficients $k_x$ and $k_y$ each range between 0 and 1.

The condition (2) is derived from the fact that for the value 1 of the abscissa α, the voltage $V_s$ cannot, at most, be equal to the voltage U.

To ensure that the values of the resistors R1 and R2 are positive, in this case, the following conditions are stipulated:

$$R_x/4 + R_m < R1_x; \text{ and} \quad \text{condition (5)}$$

$$R_y/4 + R_n < R1_y. \quad \text{condition (6)}$$

Conditions (5) and (6) were established based on the observation that the maximum values of the resistances $RT_X$ and $RT_y$ are respectively equal to $R_x/4$ and $R_y/4$.

During a step 98, the component 6, the return mechanism 20 and the printed circuit 58 on which the potentiometer 60 is mounted are provided and assembled inside the housing 4 so that:

- the mechanism 20 tends to hold the component 6 in its neutral position; and
- the component 6 moves the cursor 62 when it moves between its close and remote positions.

At this stage, the electronic circuit is identical to the circuit 30 except that:

- the resistors R1, R2, $(1-k_x)R_x$, $k_yR_y$ are shunted so that the terminals 66 and 68 are respectively directly connected to the terminals 32 and 38 of the electronic circuit; and
- the resistors $k_xR_x$ and $(1-k_y)R_y$ are omitted so that the center taps 74 and 72 are respectively electrically isolated from the terminals 32 and 38.

Under these conditions, the value $R_{60T}$ of the total resistance of the potentiometer 60 can be measured by measuring the resistance between the terminals 32 and 38.

Then, during a phase 100, the various resistors of the circuit 30 are sized so that the transfer function of the manufactured button is identical to a target transfer function.

During a step 102, the value $R_{60T}$ of the total resistance of the potentiometer 60 is measured. For example, the value of a resistance is measured by connecting an ohmmeter to these terminals. In this case, in order to measure the value $R_{60T}$, the ohmmeter is connected between the terminals 32 and 38 of the circuit 30, for example. Subsequently, the digital examples are provided for the particular case where the value $R_{60T}$ is equal to 9.98 kΩ.

During a step 104, the component 6 is manually moved to its remote position. When the component 6 is held in this remote position, a value RP1 of the resistance between the terminals 42 and 48 is measured.

During a step 106, the component 6 is gently released in order to avoid inertia and the mechanism 20 automatically returns it from its remote position to its neutral position. When the component 6 is immobilized in its neutral position, a value RP2 of the resistance between the terminals 42 and 48 is measured.

During a step 108, the component 6 is moved from its neutral position to its close position. When the component 6 is held in this close position, a value RP3 of the resistance between the terminals 42 and 48 is measured.

During a step 110, the component 6 is gently released in order to avoid inertia and the mechanism 20 automatically returns the component 6 from its close position to its neutral position. When the component 6 is immobilized in its neutral position, a new value RP4 of the resistance between the terminals 42 and 48 is measured.

Then, during a step 112, the various features of the potentiometer 60 are computed from the previously measured values RP1 to RP4.

More specifically, the deviation $dR/R_{60N}$ is computed. To this end, the nominal value $R_{60N}$ is obtained from the technical documentation of the potentiometer 60 provided by the manufacturer of this potentiometer 60. In this case, the deviation $dR/R_{60N}$ is computed using the following relation $dR/R_{60N}=R_{60T}/R_{60N}-1$.

Hereafter, the digital examples are provided in the particular case whereby the value $R_{60N}$ is equal to 10 kΩ and the deviation $dR/R_{60N}$ is equal to −0.012.

The value of the resistor $R_m$ is computed using the following relation: $R_m=R_{60T}-RP1$. Hereafter, the digital examples are provided in the particular case whereby the value of the resistor $R_m$ is equal to 0.1 kΩ.

The value of the resistor $R_n$ is equal to the value RP3. Hereafter, the digital examples are provided in the particular case whereby the value of the resistor $R_n$ is equal to 0 kΩ.

The value of the resistor RPU is computed using the following relation:

$$RPU = R_{60T} - R_m - R_n.$$

The average value RPM of the resistance between the terminals 42 and 48 when the component 6 is in its neutral position is computed using the following relation:

$$RPM = (RP2 + RP4)/2.$$

The deviation dα is computed using the following relation: $d\alpha=(RPM-R_n)/RPU-1/2$. Hereafter, the digital examples are provided in the particular case whereby the deviation dα is equal to 0.09.

Conditions (1.1), (3.1) and (4.1) depend on the values of the deviations dα and $dR/R_{60N}$. Hereafter, in order to simplify the implementation of the following steps of the phase 100 of sizing the various resistors of the circuit 30, conditions (1.1), (3.1) and (4.1) are replaced by conditions independent of the deviations dα and $dR/R_{60N}$. To this end, these deviations are replaced by values that are each considered to be equal, and in each of the conditions, to the worst-case. In this case, it is considered that, in the worst case, the amplitudes of the deviations $d\alpha$ and $dR/R_{60N}$ are both equal to 0.1, which corresponds to an error of 10% with respect to the theoretical value. Moreover, in each of the conditions (1.1), (3.1) and (4.1), the signs of the deviations $d\alpha$ and $dR/R_{60N}$ are selected so as to be equal to the signs that provide the most restrictive conditions. Thus, subsequently, conditions (1.1), (3.1) and (4.1) are respectively replaced by the following conditions (1.2), (3.2) and (4.2):

$$0.1*C_1 < C_2 < 1-1.1*C_1; \quad \text{condition (1.2)}$$

$$0 \le R1_x/R_{60N} \le 0.9*[(1-C_2)/C_1-1.1]; \text{ and} \quad \text{condition (3.2)}$$

$$0 \le R2_y/R_{60N} \le [C_2/C_1-0.1]*0.9. \quad \text{condition (4.2)}$$

During a step 114, the target values $C_{1c}$ and $C_{2c}$, respectively, of the coefficients $C_1$ and $C_2$ are acquired if they have not already been acquired. The target values $C_{1c}$ and $C_{2c}$ are then the same for all the manufactured buttons so as to manufacture a set of buttons 2 with identical transfer functions.

The target values $C_{1c}$ and $C_{2c}$ are selected so as to satisfy conditions (1.2) and (2).

In this case, the value $C_{1c}$ is selected so as to be equal to 0.5. Condition (1.2) then stipulates selecting the value $C_{2c}$ between 0.05 and 0.45. In this case, the value $C_{2c}$ is selected so as to be equal to 0.25.

During a step 116, the values of the resistances $R1_x$ and $R2_y$ are selected so as to comply with conditions (3.2) and (4.2) when the values of the coefficients $C_1$ and $C_2$ are respectively equal to the target values $C_{1c}$ and $C_{2c}$. Conditions (3.2) and (4.2) stipulate that the values of the resistances $R1_x$ and $R2_y$ are less than or equal to limits $LS1_x$ and $LS2_y$, respectively. The limits $LS1_x$ and $LS2_y$ are respectively equal to $0.9*[(1-C_{2c})/C_{1c}-1.1]*R_{60N}$ and $0.9*(C_{2c}/C_{1c}-0.1)*R_{60N}$.

In this example, it is assumed that the value $R_{60N}$ is equal to 10 kΩ. Under these conditions, the limits $LS1_x$ and $LS2_y$ are both equal to 3.6 kΩ.

Preferably, the values of the resistances $R1_x$ and $R2_y$ are selected so as to be close to the upper limits $LS1_x$ and $LS2_y$. In this case, the values of the resistances $R1_x$ and $R2_y$ are selected so as to be greater than $0.9*LS1_x$ and $0.9*LS2_y$, respectively. Even more advantageously, the values of the resistances $R1_x$ and $R2_y$ are selected so as to be greater than $0.95*LS1_x$ and $0.95*LS2_y$, respectively. In this example, the values of the resistances $R1_x$ and $R2_y$ are both selected so as to be equal to 3.3 kΩ.

During a step 118, the values of the resistances $R_x$ and $R_y$ are selected according to conditions (5) and (6). Conditions (5) and (6) stipulate that the values of the resistances $R_x$ and $R_y$ are less than or equal to upper limits $LS_x$ and $LS_y$, respectively. The limits $LS_x$ and $LS_y$ are respectively equal to $4*(R1_x-R_m)$ and $4*(R2_y-R_n)$. When the values of the resistances $R1_x$ and $R2_y$ are equal to 3.3 kΩ, the limits $LS_x$ and $LS_y$ are respectively equal to 12.8 kΩ and 13.2 kΩ.

Preferably, the values of the resistances $R_x$ and $R_y$ are selected so as to be close to the upper limits $LS_x$ and $LS_y$. In this case, the values of the resistances $R_x$ and $R_y$ are selected so as to be greater than $0.9*LS_x$ and $0.9*LS_y$, respectively. Even more advantageously, the values of the resistances $R_x$ and $R_y$ are selected so as to be greater than $0.95*LS_x$ and $0.95*LS_y$, respectively. In this example, the values of the resistances $R_x$ and $R_y$ are both selected so as to be equal to 12 kΩ.

During a step 120, the values of the coefficients $k_x$ and $k_y$ are computed using the following relations:

$$k_x = C_{2c} + C_{1c}*[1-d\alpha+(R1_x/R_{60N})/(1+dR/R_{60N})];$$

$$k_y = C_{2c} - C_{1c}*[d\alpha+(R2_y/R_{60N})/(1+dR/R_{60N})].$$

In order to compute the coefficients $k_x$ and $k_y$, the values of the deviations $d\alpha$ and $dR/R_{60N}$ are taken as equal to the values computed during step 112. The values of the resistances $R1_x$ and $R2_y$ are taken as equal to those selected during step 116. Under these conditions, the coefficients $k_x$ and $k_y$ are respectively equal to 0.872 and to 0.038.

During a step 122, the values of the resistances $RT_x$ and $RT_y$ are computed using the following relations:

$$RT_x = k_x*(1-k_x)*R_x; \text{ and}$$

$$RT_y = k_y*(1-k_y)*R_y.$$

The values of the resistances $RT_x$ and $RT_y$ in this case are respectively equal to 1.339 kΩ and 0.439 kΩ.

Then, during a step 124, the values of the resistors R1 and R2 are computed using the following relations:

$$R1 = R1_x - RT_x - R_m; \text{ and}$$

$$R2 = R2_y - RT_x - R_m.$$

During this step 124, the values of the resistors $(1-k_x)R_x$, $k_xR_x$, $(1-k_y)R_y$ and $k_yR_y$ are also computed from the values of the coefficients $k_x$, $k_y$ computed during step 120 and the values of the resistances $R_x$ and $R_y$ selected during step 118.

The values of the resistors R1, R2, $(1-k_x)R_x$, $k_xR_x$, $(1-k_y)R_y$ and $k_yR_y$ in this case are respectively equal to 1.861 kΩ, 2.861 kΩ, 1.536 kΩ, 10.464 kΩ, 11.544 kΩ and 0.456 kΩ.

It is easier to use commonly marketed resistors than resistors specifically developed to have exactly the values specified during step 124. For spatial requirement reasons, it is also preferable to use a single resistor with the specified value rather than to use a combination of several resistors connected in parallel and/or in series in order to obtain the specified value. Thus, in this case, each value specified during step 124 is obtained using a single commonly marketed resistor.

The marketed resistors are classified in series, with each series corresponding to a number of different values of possible resistances per decade. The greater the number of possible values in a decade, the greater the accuracy of the value of a resistance. In this case, during a step 126, the resistors R1, R2, $(1-k_x)R_x$, $k_xR_x$, $(1-k_y)R_y$, $k_yR_y$ are selected from a series comprising at least ninety-six values per decade in order to obtain values for the coefficients $C_1$ and $C_2$ that are very close to the target values. In this case, the values of these resistances are selected from the series E96. The values of the resistors R1, R2, $(1-k_x)R_x$, $k_xR_x$, $(1-k_y)R_y$, $k_yR_y$ are therefore respectively equal to 1.87 kΩ, 2.87 kΩ, 1.54 kΩ, 10.5 kΩ, 11.5 kΩ and 0.453 kΩ.

Under these conditions, the values obtained for coefficients $C_1$ and $C_2$ of the button 2 are respectively equal to 0.497 and to 0.251. This represents an error with an amplitude, as a percentage of the target value, that is less than 0.58% and 0.4%, respectively.

The phase 100 is then complete and the method continues with a step 130, during which the resistors selected during step 126 are mounted on the printed circuit 58, for example, by soldering. The circuit 30 is then obtained.

Then, during a step 132, the printed circuit 58 comprising all the resistors of the circuit 30 is mounted in the housing 4 and then the housing 4 is closed. The manufacture of the button 2 is complete.

Steps 98 to 132 are then repeated several times with the same target values $C_{1c}$ and $C_{2d}$ in order to obtain the set of several buttons with identical transfer functions.

Chapter III: Alternative Embodiments

Alternative embodiments of the printed circuit and of the electronic circuit:

The embodiment of Chapter II has been described in the particular case whereby the transfer function of the button 2 and the transfer function of the circuit 30 are identical because the printed circuit 58 comprises no other additional resistor connected upstream or downstream of the circuit 30. An additional resistor connected upstream of the circuit 30 is a resistor connected between the circuit 30 and the power supply terminals 32 and 38. An additional resistor connected downstream of the circuit 30 is a resistor connected between the circuit 30 and the output terminals 42, 48. However, as an alternative embodiment, the printed circuit 58 can comprise such additional resistors. In this case, the sizing phase 100 is applied to the single circuit 30 devoid of these additional resistors, i.e., to the electronic circuit shown in FIG. 3 that is only made up of the resistors R1, R2, $(1-k_x)R_x$, $k_xR_x$, $(1-k_y)R_y$, $k_yR_y$ and of the potentiometer 60. Typically, to this end, during the phase 100, the additional resistors are replaced by shunts. Subsequently, the additional resistors are mounted on the integrated circuit (e.g., the printed circuit 58) during step 130, in addition to the resistors R1, R2, $(1-k_x)R_x$, $k_xR_x$, $(1-k_y)R_y$, $k_yR_y$. These additional resistors modify the transfer function of the complete button but do not modify the transfer function of the circuit 30. Consequently, if these additional resistors are the same for all the manufactured buttons, a set of buttons with identical transfer functions is obtained. Indeed, the manufacturing tolerances on the additional resistors are generally less than or equal to 10% and preferably less than or equal to 1%, so that their influence on the values of the coefficients of the transfer function of the button remains limited.

The printed circuit 58 can comprise electronic circuits other than the circuit 30. For example, as an alternative embodiment, it comprises a voltage rectifier circuit. In this case, the power supply source is an AC voltage source.

Each of the resistors $(1-k_x)R_x$, $k_xR_x$, $(1-k_y)R_y$, $k_yR_y$, R1 and R2 can be in the form of several resistors mounted in series and/or in parallel instead of a single resistor. As an alternative embodiment, the resistors $(1-k_x)R_x$, $k\,R_x$, $(1-k_y)R_y$, $k_yR_y$, R1 and R2 are not commonly marketed resistors but are resistors whose values are specifically adjusted to correspond to the values specified during step 124. For example, this can involve resistors whose values are adjusted using a laser beam. In this case, step 126 is omitted.

As an alternative embodiment, the resistors $k_xR_x$ and $(1-k_x)R_x$ are replaced by a potentiometer, for which:

- a first connection terminal is directly connected to the power supply terminal 32;
- a second connection terminal is directly connected to the power supply terminal 38;
- the value of its total resistance between these first and second connection terminals is equal to $R_x$; and
- a center tap is directly connected to the resistor R1.

Similarly, the resistors $k_yR_y$ and $(1-k_y)R_y$ can be replaced by a potentiometer whose total resistance is equal to $R_y$.

If the values of the resistors $R_a$ and $R_m$ are not zero, then in this case the values of the resistors R1 and R2 can be zero.

The DC power supply source 34 can be replaced by an AC power supply source. In this case, the signal delivered to the output terminal 48 of the circuit 30 is also an alternating signal.

Alternative Embodiments of the Manufacturing Method

Other methods for manufacturing and for sizing the resistors of the circuit 30 are possible. For example, as an alternative embodiment, instead of setting the values of the deviations da and $dR/R_{60N}$ to constant values corresponding to the worst cases, during each iteration of the method of FIG. 4, the values of the deviations $d\alpha$ and $dR/R_{60N}$ are taken as equal to the values of these deviations computed from the values measured when executing steps 102 to 110. In this case, conditions (3.1) and (4.1) are used during the phase 100 of sizing the resistors and not conditions (3.2) and (4.2). However, in order for the target values $C_{1c}$ and $C_{2c}$ to be suitable for all the manufactured buttons, it is still worthwhile selecting these target values by taking into account the worst cases rather than the deviations $d\alpha$ and $dR/R_{60N}$ measured in a particular case.

As an alternative embodiment, the amplitudes of the deviations $d\alpha$ and $dR/R_{60N}$ corresponding to the worst case can be greater than or less than 0.1 or 0.3. However, the greater the deviation $d\alpha$, the more limited the choice on the target values $C_{1c}$ and $C_{2c}$. Similarly, the greater the deviation $dR/R_{60N}$, the more this limits the possible choices for the various values of the resistors of the circuit 30. The amplitudes of these deviations $d\alpha$ and $dR/R_{60N}$ in the worst case are not necessarily equal either.

If the return mechanism 20 does not have a hysteresis phenomenon, then one of the steps 106 and 110 of measuring the resistance when the cursor is in its neutral position can be omitted. In this case, the value RPM is therefore directly measured and no longer corresponds to an average of several measurements.

As an alternative embodiment, by design, the values of the resistors $R_a$ and $R_m$ are zero. In this case, their value does not need to be measured when implementing the sizing method. These values of the resistors $R_a$ and $R_m$ are directly and systematically taken as being equal to zero.

In another alternative embodiment, during step 118, the values of the upper limits $LS_x$ and $LS_y$ are computed by replacing the values of the resistances $R1_x$ and $R2_y$ with the values of the limits $LS1_x$ and $LS2_y$, respectively.

As an alternative embodiment, step 126 is replaced by a step of designing resistors with the values computed during step 124.

The aforementioned conditions are partly derived from the conventions that are used. For example, by design, in this case, the abscissa $\alpha$ has been considered to only vary between 0 and 1. However, another convention can be used. For example, by design, it could be decided that the abscissa $\alpha$ varies between −0.5 and 0.5 or between 0 and 2 or between 0 and 0.75. Similarly, by design, it has been considered that the coefficients $k_x$ and $k_y$ vary between 0 and 1. Another convention also can be used for the range of values of these coefficients. For example, it is possible to decide that, by design, the coefficients $k_x$ and $k_y$ vary between 0 and 0.75 or between 0.1 and 0.9. However, the values of the coefficients $k_x$ and $k_y$ must remain between 0 and 1. In the event that one of the previous conventions is modified, the previously stated conditions must be adapted to the convention that is used.

As an alternative embodiment, the manufacturing method does not use any or uses only some of the conditions described above in order to determine the values of the resistors R1, R2, $k_xR_x$, $(1-k_x)R_x$, $k_yR_y$ and $(1-k_y)R_y$. For example, the values of the resistors $R_n$, $R_m$, RPU, the deviation $dR/R_{60N}$ and the deviation $d\alpha$ are measured as previously described. Subsequently, different values can be tested for each of these resistors, until a set of resistors is found that minimizes the deviation between the obtained transfer function and the target transfer function. Typically, these tests are carried out by means of a digital simulation of the electronic circuit 30. Indeed, for a given set of values for the resistors R1, R2, $k_xR_x$, $(1-k_x)R_x$, $k_yR_y$ and $(1-k_y)R_y$, the digital simulation software for electrical circuits allows the corresponding transfer function of the button, and therefore the deviation from a target transfer function, to be obtained. Thus, by means of successive tests, it is possible to find one or more sets of resistors that allow the target transfer function to be obtained. This latter method offers the advantage of exploring a much wider field of possible values for the resistors R1, R2, $k_xR_x$, $(1-k_x)R_x$, $k_yR_y$ and $(1-k_y)R_y$ because it is not limited by the previously described conditions. Thus, this method can allow a set of values to be found for these resistors that allows the target transfer function to be obtained, yet without meeting all the conditions described above. In other words, the solution that is found is not necessarily unique. Just because the method of FIG. 4 has allowed a solution to be found does not mean that there are no other solutions that can achieve the desired target transfer function. By way of example, this method for determining the values of the resistors R1, R2, $k_xR_x$, $(1-k_x)R_x$, $k_yR_y$ and $(1-k_y)R_y$ can be implemented using a solver from software such as Microsoft® Excel® software or using the method known under the term "parameter stepping" for electrical circuit simulation software, such as LTSpice®. Any other digital resolution method can allow a solution to be found, including, in a non-exhaustive manner, the gradient method, minimization of a quadratic criterion, linear optimization; probabilistic techniques also can be used to implement this alternative embodiment of the manufacturing method.

The manufacturing method has been described in a particular context where the aim is to manufacture a set of buttons that all have the same transfer function. However, the teaching provided herein also can be used in other contexts. For example, it can be used for manufacturing a custom button. In this case, the target transfer function is specified by a client wishing to acquire a button with this target transfer function. The method of FIG. 4 is then implemented in order to achieve the specified target transfer function. In this context, in an extreme case, for each specified target transfer function, a single button with this transfer function is manufactured. Within the context of custom manufacturing, all the manufactured buttons do not have the same transfer function. Thus, the manufactured buttons differ from one another in terms of their respective values of the resistors R1, R2, $k_xR_x$, $(1-k_x)R_x$, $k_yR_y$, $(1-k_y)R_y$. However, the architecture of the electronic circuit 30 remains the same for all these buttons.

Other Alternative Embodiments

The gripping component 6 also can be a pusher that translationally moves along a straight trajectory when it is moved by the user. Typically, in this case, the pusher slides along a slot or the like.

The component 6 also can be the handle of a joystick. In this case, the component 6 can move along several non-collinear straight trajectories. For example, the component 6 moves along two trajectories that are straight and orthogonal to each other. In this case, the button then comprises as many copies of the circuit 30 as there are possible trajectories along which the component 6 can move. Each of these copies of the circuit 30 is associated with a respective trajectory from among the various possible trajectories. This copy of the circuit 30 then only measures the position of the component 6 along the trajectory with which it is associated. Each of these copies of the circuit 30 is designed and operates as described in the particular case of the circuit 30 of the button 2.

As an alternative embodiment, the trajectory along which the component 6 moves is not straight. For example, the trajectory is curvilinear or assumes another shape.

The component 6 also can be moved along its trajectory not by the thumb but by the hand of the user, or by the foot of the user or by another part of the user.

In another alternative embodiment, the component 6 is moved by an automaton or by any other mechanical element and not by a human user.

In a particular embodiment, the component 6 and the cursor 62 are made from the same block of material and form a single part.

As an alternative embodiment, the theoretical neutral position is not located halfway between the close and remote positions. For example, the theoretical neutral position is coincident with the close position or with the remote position. The teaching provided in the particular case whereby the neutral position is located halfway between the close and remote positions also applies to the case whereby the theoretical neutral position is located elsewhere along the trajectory 16.

Chapter IV: Advantages of the Described Embodiments

The architecture of the electronic circuit 30 of the button 2 and, in particular, the presence of the resistors R1, R2, $k_xR_x$, $(1-k_x)R_x$, $k_yR_y$, $(1-k_y)R_y$ and their arrangement with respect to one another allows, by adjusting the value of these six resistors, a target transfer function to be obtained that is predetermined in advance, despite the existence of a manufacturing tolerance on the potentiometer and the return mechanism. Moreover, in order to manufacture these buttons, potentiometers do not need to be used with very low manufacturing tolerances in terms of their features, i.e., complex potentiometers to manufacture. On the contrary, it is possible to use potentiometers with normal or wide manufacturing tolerances with respect to the nominal values stipulated by the manufacturer. Similarly, a mechanism for returning the cursor to its very precise neutral position does not need to be used, i.e., a mechanism in which the deviation $d\alpha$ is very small. On the contrary, a relatively inaccurate return mechanism can be used. Finally, in this button, the desired transfer function is obtained without having to use complex electronic components such as a microprocessor or the like. This possibility of obtaining a predetermined target transfer function without using complex electronic components can be used, for example, in order to obtain the same transfer function as that of another button equipped with another potentiometer and another return mechanism. Thus, by virtue of the electronic circuit 30 proposed herein, buttons can be manufactured that all have the same transfer functions. This possibility also can be used to manufacture custom buttons each having its own target transfer function specified by a client.

The fact that the coefficients $C_1$ and $C_2$ satisfy conditions (1.1) and (2) means that the same transfer function can be obtained as another button with a similar architecture in the case whereby the tolerance in terms of the value of the abscissa α in the neutral position is more or less than 30% or more or less than 10%.

The fact that the coefficients $C_1$ and $C_2$ satisfy conditions (1.1) and (2) also means that the same transfer function can be obtained as another button with a similar architecture in the case whereby the tolerance in terms of the values of the resistors is greater or less than the initially provided tolerance (series of different resistors) in order to address any supply shortages.

The fact that the values of the resistors R1, R2, $(1-k_x)R_x$, $k_xR_x$, $(1-k_y)R_y$ and $k_yR_y$ satisfy conditions (3.1), (4.1), (5) and (6) means that it is possible to simply determine a set of values for these resistors that allows the target values $C_{1c}$ and $C_{2c}$ to be obtained despite the deviations dα and $dR/R_{60N}$.

The fact that the values of these resistors $R1_x$, $R2_y$, $R_x$ and $R_y$ are also closer to their upper limits means that it is possible to avoid obtaining very small values for these resistors. This simplifies the production of these resistors.

Using precise resistances for producing these resistors allows coefficients $C_1$ and $C_2$ to be obtained that deviate by no more than 1% or 2% from the target values $C_{1c}$ and $C_{2c}$.

The invention claimed is:

1. A button comprising:

an electronic circuit equipped with:

a cursor capable of moving along a predetermined trajectory between a proximal position and a distal position;

a first power supply terminal and a second power supply terminal able to be connected to respective poles of a power supply source;

a first output terminal and a second output terminal, between which is delivered a voltage representing the position of the cursor along its trajectory; and a linear potentiometer comprising:

a first connection terminal and a second connection terminal respectively connected to the first power supply terminal and the second power supply terminal; and a first center tap connected to the first output terminal, with a resistance between the first center tap and the second connection terminal continuously varying from a minimum value to a maximum value when the cursor is moved from one of the proximal position and the distal position to the other one of the proximal position and the distal position; and a return mechanism that automatically returns the cursor to a neutral position in the absence of external stress;

wherein the electronic circuit comprises:

a second center tap connected:

to the first connection terminal for connecting the potentiometer via a first resistor;

to the first power supply terminal via a second resistor, the value of the second resistor being equal to $(1-k_x)R_x$, where $k_x$ is a coefficient ranging between 0 and 1, and $R_x$ is a constant value of a first total resistance; and to the second power supply terminal via a third resistor, the value of the third resistor being equal to $k_xR_x$; and a third center tap connected:

to the second connection terminal for connecting the potentiometer via a fourth resistor;

to the first power supply terminal via a fifth resistor, the value of the fifth resistor being equal to $(1-k_y)R_y$, where $k_y$ is a coefficient ranging between 0 and 1, and $R_y$ is a constant value of a second total resistance; and to the second power supply terminal via a sixth resistor, the value of the sixth resistor being equal to $k_yR_y$.

2. The button of claim 1, wherein the transfer function of the electronic circuit formed by the first resistor to the sixth resistor and the potentiometer is a line, the equation of which is $V_s/U=\alpha C_1+C_2$, where:

$V_s$ is the voltage between the first output terminal and the second output terminal;

U is the DC voltage between the first power supply terminal and the second power supply terminal;

α is the value of the curvilinear abscissa of the cursor along its trajectory between the proximal position and the distal position, with the abscissa a varying between 0 and 1 in proportion to the length of the trajectory covered by the cursor from the proximal position, with the value 0 of the abscissa a corresponding to the proximal position and the value 1 of the abscissa a corresponding to the distal position; and $C_1$ and $C_2$ are non-zero constant coefficients satisfying the following two conditions: $d\alpha_{max}*C_1<C_2<1-(1+d\alpha_{max})*C_1$ and $C_1+C_2\leq 1$, where $d\alpha_{max}$ is greater than zero and less than or equal to 0.3.

3. The button of claim 2, wherein the values of the first resistor to the sixth resistor all satisfy the following conditions:

$$0 \leq R1_x/R_{60N} \leq \left[(1-C_2)/C_1-(1-d\alpha)\right]*\left(1+dR/R_{60N}\right); \quad \text{condition (3.1)}$$

$$0 \leq R2_y/R_{60N} \leq \left[C_2/C_1-d\alpha\right]*\left(1+dR/R_{60N}\right); \quad \text{condition (4.1)}$$

$$R_x \leq 4*(R1_x-R_m);\ \text{and} \quad \text{condition (5)}$$

$$R_y \leq 4*(R2_y-R_n); \quad \text{condition (6)}$$

where:

$R1_x$ is equal to $R1+RT_x+R_m$;

$R2_y$ is equal to $R2+RT_y+R_n$;

$RT_x$ is equal to $k_x*(1-k_x)*R_x$;

$RT_y$ is equal to $k_y*(1-k_y)*R_y$;

R1 and R2 are the values of the first resistor and the fourth resistor, respectively;

$R_x$ is equal to the sum of the values of the second resistor and the third resistor;

$R_y$ is equal to the sum of the values of the fifth resistor and the sixth resistor;

$k_x$ is equal to the value of the third resistor divided by $R_x$;

$k_y$ is equal to the value of the sixth resistor divided by $R_y$;

$R_m$ is equal to the deviation between the measured value $R_{60T}$ of the total resistance of the potentiometer and the measured value of the resistance of the potentiometer between the first center tap and the second connection terminal when the value of the abscissa a is equal to 1;

$R_n$ is the measured value of the resistance of the potentiometer between the first center tap and the second connection terminal when the value of the abscissa $\alpha$ is equal to 0;

$d\alpha$ is equal to the deviation between the desired theoretical neutral position and the actually measured neutral position;

$dR/R_{60N}$ is equal to the ratio $(R_{60T}-R_{60N})/R_{60N}$, where $R_{60T}$ is the measured value of the total resistance of the potentiometer, and $R_{60N}$ is the nominal value of the total resistance of the potentiometer;

$C_1$ and $C_2$ are the measured coefficients of the transfer function of the electronic circuit formed by the first resistor to the sixth resistor and the potentiometer; and the symbol "*" designates the arithmetic multiplication operation.

4. The button of claim 3, wherein:

the value of the resistance $R1_x$ is greater than $0.9*[(1-C_2)/C_1-(1-d\alpha)]*(1+dR/R_{60N})*R_{60N}$;

the value of the resistance $R2_y$ is greater than $0.9*[C_2/C_1-d\alpha]*(1+dR/R_{60N})*R160N$, the value of the resistance $R_x$ is greater than or equal to $0.9*4*(R1_x-R_m)$; and the value of the resistance $R_y$ is greater than or equal to $0.9*4*(R2_y-R_n)$.

5. The button of claim 1, wherein the first resistor to the sixth resistor are resistors each belonging to a series comprising at least ninety-six values per decade.

6. The button of claim 1, wherein the neutral position to which the return mechanism is configured to automatically return the cursor is a neutral position corresponding to a value of the abscissa $\alpha$ ranging between 0.4 and 0.6.

7. The button of claim 1, wherein the button further comprises a gripping component able to be moved by a user by hand, the gripping component being mechanically connected to the cursor in order to move the cursor when the gripping component is moved.

8. A set comprising more than one hundred of the button of claim 1, wherein the transfer function of the electronic circuit of each of the buttons is a line, the equation of which is $V_s/U=\alpha C_1+C_2$, where:

$V_s$ is the voltage between the first output terminal and the second output terminal;

U is the DC voltage between the first power supply terminal and the second power supply terminal;

$\alpha$ is the value of the curvilinear abscissa of the cursor along its trajectory between the proximal position and the distal position, with the abscissa a varying between 0 and 1 in proportion to the length of the trajectory covered by the cursor from the proximal position, with the value 0 of the abscissa $\alpha$ corresponding to the proximal position and the value 1 of the abscissa $\alpha$ corresponding to the distal position; and $C_1$ and $C_2$ are constant coefficients; and wherein target value $C_{1c}$ and target value $C_{2c}$ exist that are common to all the buttons of the set such that, irrespective of the button belonging to this set:

the deviation between the coefficient $C_1$ of the button and the target value $C_{1c}$ is less than 5% or 1%; and the deviation between the coefficient $C_2$ of the button and the target value $C_{2c}$ is less than 5% or 1%.

9. A method for manufacturing the button of claim 1, the method comprising:

providing the potentiometer;

measuring the value of the total resistance of the potentiometer and a deviation $dR/R_{60N}$ between the measured value of the total resistance and the nominal value of this the total resistance, with the deviation being defined by the following relation: $dR/R_{60N}=(R_{60T}/R_{60N})/R_{60N}$;

measuring a deviation $d\alpha$ between the measured value of the curvilinear abscissa when the cursor is held in the neutral position by the return mechanism of the button and the theoretical value of the curvilinear abscissa when the cursor occupies the neutral position;

measuring the value $R_m$ that is equal to the difference between the value of the total resistance of the potentiometer and the value of the resistance of the potentiometer between the first center tap and the second connection terminal when the value of the abscissa $\alpha$ is equal to 1;

measuring the value $R_n$ that is equal to the value of the resistance of the potentiometer between the first center tap and the second connection terminal when the value of the abscissa $\alpha$ is equal to 0;

acquiring target value $C_{1c}$ and target value $C_{2c}$, respectively for the coefficients $C_1$ and $C_2$ of the transfer function of the electronic circuit of the button only equipped with the first resistor to the sixth resistor, with the target value $C_{1c}$ and the target value $C_{2c}$ satisfying the following conditions: $d\alpha_{max}*C_{1c}<C_{2c}<1-(1+d\alpha_{max})*C_{1c}$ and $C_{1c}+C_{2c}\leq 1$, where $d\alpha_{max}$ is greater than zero and less than or equal to 0.3;

selecting values for the resistors $R1_x$ and $R2_x$ that satisfy the following conditions: $0\leq R1_x/R_{60N}\leq[(1-C_{2c})/C_{1c}-(1-d\alpha)]*(1+dR/R_{60N})$ and $0\leq R2_y/R_{60N}\leq[C_{2c}/C_{1c}-d\alpha]*(1+dR/R_{60N})$;

selecting values for the resistors $R_x$ and $R_y$ that satisfy the following conditions: $R_x\leq 4*(R1_x-R_m)$ and $R_y\leq 4*(R2_y-R_n)$;

computing coefficients $k_x$ and $k_y$ using the following relations: $k_x=C_{2c}+C_{1c}*[1-d\alpha+(R1_x/R_{60N})/(1+dR/R_{60N})]$ and $k_y=C_{2c}-C_{1c}*[d\alpha+(R2_y/R_{60N})/(1+dR/R_{60N})]$;

computing resistances $RT_x$ and $RT_y$ using the following relations: $RT_x-k_x*(1-k_x)*R_x$ and $RT_y=k_y*(1-k_y)*R_y$;

computing the values R1 and R2, respectively, of the first resistor and the fourth resistor using the following relations: $R1=R1_x-RT_x-R_m$ and $R2=R2_y-RT_x-R_m$; and computing the values $(1-k_x)R_x$, $k_xR_x$, $(1-k_y)R_y$ and $k_yR_y$, respectively, of the second resistor, the third resistor, the fifth resistor, and the sixth resistor from the computed values of the coefficients $k_x$, $k_y$ and the selected values of the resistances $R_x$ and $R_y$.

10. The method of claim 9, wherein the method further comprises selecting the values R1, R2, $k_xR_x$, $(1-k_x)R_x$, $k_yR_y$ and $(1-k_y)R_y$ from a series of resistors having at least ninety-six values per decade.

* * * * *